(12) United States Patent
Guo

(10) Patent No.: US 11,258,954 B2
(45) Date of Patent: Feb. 22, 2022

(54) IMAGE PROCESSING METHOD AND APPARATUS, AND ELECTRONIC DEVICE AND STORAGE MEDIUM

(71) Applicant: BEIJING MICROLIVE VISION TECHNOLOGY CO., LTD, Beijing (CN)

(72) Inventor: He Guo, Beijing (CN)

(73) Assignee: BEIJING MICROLIVE VISION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/979,325

(22) PCT Filed: Feb. 1, 2019

(86) PCT No.: PCT/CN2019/074399
§ 371 (c)(1),
(2) Date: Sep. 9, 2020

(87) PCT Pub. No.: WO2020/062749
PCT Pub. Date: Apr. 2, 2020

(65) Prior Publication Data
US 2021/0211566 A1 Jul. 8, 2021

(30) Foreign Application Priority Data
Sep. 30, 2018 (CN) .......................... 201811163394.7

(51) Int. Cl.
*H04N 5/235* (2006.01)
*H04N 5/202* (2006.01)

(52) U.S. Cl.
CPC ........... *H04N 5/2351* (2013.01); *H04N 5/202* (2013.01); *H04N 5/2352* (2013.01); *H04N 5/2353* (2013.01)

(58) Field of Classification Search
CPC .... H04N 5/2351; H04N 5/202; H04N 5/2353; H04N 5/2352
See application file for complete search history.

(56) References Cited

U.S. PATENT DOCUMENTS 5,128,769 A * 7/1992 Arai ........................ H04N 5/235
348/363
9,654,698 B2 5/2017 Arakawa
(Continued)

FOREIGN PATENT DOCUMENTS

CN 1622638 A 6/2005
CN 2838167 Y 11/2006
(Continued)

OTHER PUBLICATIONS

1st Office Action dated Aug. 26, 2020 for Chinese Patent Application No. 201811163394.7.
(Continued)

*Primary Examiner* — Jason A Flohre
(74) *Attorney, Agent, or Firm* — Thomas | Horstemeyer, LLP

(57) ABSTRACT

Disclosed are an image processing method, an image processing apparatus, an electronic device, and a storage medium. The method includes: when a camera continuously outputs original images, a first frame image output by the camera is acquired; it is determined whether to perform a brightness compensation on the camera according to a brightness value of the first frame image and a brightness threshold range; and it is repeatedly continued to acquire an image to be measured output by the camera after a preset time interval and determined whether to perform the brightness compensation on the camera according to a brightness
(Continued)

value of the image to be measured and the brightness threshold range, until the camera stops outputting the original images.

16 Claims, 6 Drawing Sheets

(56) References Cited

U.S. PATENT DOCUMENTS

| | | | |
|---|---|---|---|
| 2007/0182845 A1* | 8/2007 | Hunter | H04N 5/2351 348/362 |
| 2008/0074510 A1 | 3/2008 | Chen | |
| 2009/0160968 A1* | 6/2009 | Prentice | H04N 5/2352 348/223.1 |
| 2011/0157417 A1* | 6/2011 | Wang | H04N 5/2354 348/229.1 |
| 2016/0234424 A1* | 8/2016 | Ito | H04N 5/23212 |
| 2019/0235743 A1* | 8/2019 | Ono | H04N 5/23216 |

FOREIGN PATENT DOCUMENTS

| | | |
|---|---|---|
| CN | 101305398 A | 11/2008 |
| CN | 101340512 A | 1/2009 |
| CN | 101651786 A | 2/2010 |
| CN | 102088597 A | 6/2011 |
| CN | 102291538 A | 12/2011 |
| CN | 102461160 A | 5/2012 |
| CN | 104917976 A | 9/2015 |
| CN | 106534712 A | 3/2017 |
| CN | 108206918 A | 6/2018 |

OTHER PUBLICATIONS

2nd Office Action dated Jan. 8, 2021 for Chinese Patent Application No. 201811163394.7.
Search Report dated Jul. 22, 2020 for Chinese Patent Application No. 201811163394.7.
International Search Report and Written Opinion dated May 29, 2019 for PCT Patent Application No. PCT/CN2019/074399. English Translation Provided.

* cited by examiner

IMAGE PROCESSING METHOD AND APPARATUS, AND ELECTRONIC DEVICE AND STORAGE MEDIUM

CROSS-REFERENCE TO RELATED APPLICATIONS

This is a National Stage Application, filed under 35 U.S.C. 371, of International Patent Application No. PCT/CN2019/074399, filed on Feb. 1, 2019, which claims priority to a Chinese patent application No. 201811163394.7, filed on Sep. 30, 2018, contents of both of which are incorporated herein by reference in its entirety.

TECHNICAL FIELD

Embodiments of the present disclosure relates to the technical field of communications and, for example, to an image processing method, an image processing apparatus, an electronic device and a storage medium.

BACKGROUND

With the continuous development of communications and electronic devices, functions integrated in the electronic devices become more and more diverse. A camera function of the electronic devices has been favored by more and more people. In particular, a panoramic camera may achieve a real-time stitching of multi-path videos, which has gradually become popular in people lives and work.

Since at least two cameras are configured in a panoramic camera, when environments shot by the at least two cameras are different, brightness and color of an output panoramic video will be inconsistent due to differences in lighting and color of the cameras themselves. For example, under a condition that the brightness of a shooting environment is too dark, the brightness of an image output by the cameras is relatively low, so that when a user views a corresponding video, viewing effects of the video is seriously affected, and viewing experience of the user is reduced.

SUMMARY

The present disclosure provides an image processing method, an image processing apparatus, an electronic device and a storage medium, to preprocess an image output by a camera, such that a brightness of an original image output by the camera is improved, and thus a brightness of a corresponding video is improved and use experience of users is improved.

The present disclosure provides an image processing method. The method includes steps described below.

When a camera continuously outputs original images, a first frame image output by the camera is acquired;

it is determined whether to perform a brightness compensation on the camera according to a brightness value of the first frame image and a brightness threshold range; and it is repeatedly continued to acquire an image to be measured output by the camera after a preset time interval and determined whether to perform the brightness compensation on the camera according to a brightness value of the image to be measured and the brightness threshold range, until the camera stops outputting the original images.

The present disclosure further provides an image processing apparatus. The image processing apparatus includes an acquisition module, a first determination module and a second determination module.

The acquisition module is configured to acquire a first frame image output by a camera when the camera continuously outputs original images;

the first determination module is configured to determine whether to perform a brightness compensation on the camera according to a brightness value of the first frame image and a brightness threshold range;

the second determination module is configured to: continue to acquire an image to be measured output by the camera after a preset time interval and determine whether to perform the brightness compensation on the camera according to a brightness value of the image to be measured and the brightness threshold range repeatedly, until the camera stops outputting the original images.

The present disclosure further provides an electronic device. The electronic device includes at least one processor and a memory.

The at least one processor is configured to store at least one program. The at least one program, when executed by the at least one processor, causes the at least one processor to implement the image processing method described above.

The present disclosure further provides a computer-readable storage medium. The computer-readable storage medium stores a computer program. The computer program, when executed by a processor, implements the image processing method described above.

In the embodiments of the present disclosure, when the camera continuously outputs the original images, the first frame image output by the camera is acquired; it is determined whether to perform the brightness compensation on the camera according to the brightness value of the first frame image and the brightness threshold range; and it is repeatedly continued to acquire the image to be measured output by the camera after a preset time interval and determined whether to perform the brightness compensation on the camera according to the brightness value of the image to be measured and the brightness threshold range, until the camera stops outputting the original images. So that the images output by the camera are preprocessed before a video is generated, thus the brightness of the original images is improved, and the use experience of the users is improved.

DETAILED DESCRIPTION

Figure 1:
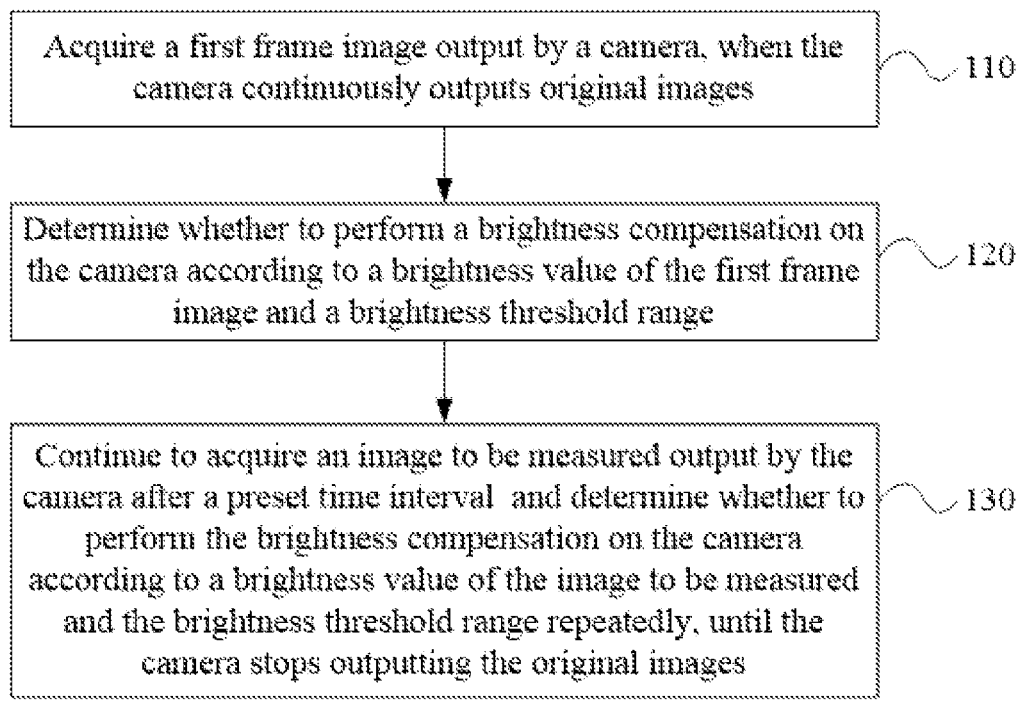
FIG. 1 is a flowchart of an image processing method according to an embodiment.

The present disclosure is described in conjunction with the drawings and embodiments below. It should be understood that the embodiments described herein are merely illustrative of the present disclosure, rather than limitations of the present disclosure. In addition, for ease of description, only some, but not all, of structures related to the present disclosure are shown in the drawings.

Embodiment

FIG. 1 is a flowchart of an image processing method according to an embodiment, the present embodiment is applicable to a case of improving brightness of an image output by a camera, this method may be executed by an image processing apparatus, which may be implemented by using software and/or hardware and be arranged in an electronic device. The electronic device may be composed of two or more physical entities, and may also be composed of one physical entity. In general, the electronic device needs to be equipped with a camera so as to have a shooting performance, and the electronic device may be a smart phone, a tablet computer or a camera and so on. Referring to FIG. 1, the method includes steps described below.

In step 110, when the camera continuously outputs original images, a first frame image output by the camera is acquired.

Figure 2:
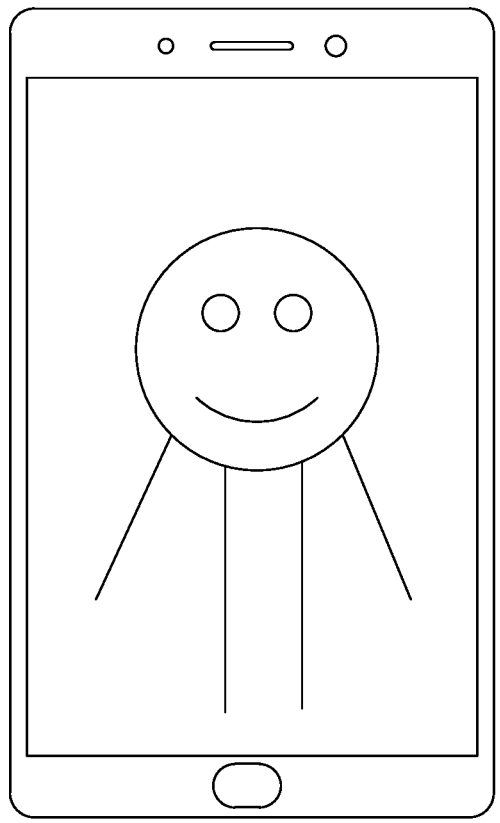
FIG. 2 is a schematic diagram of an image without superimposed a special effect according to an embodiment.
Figure 3:
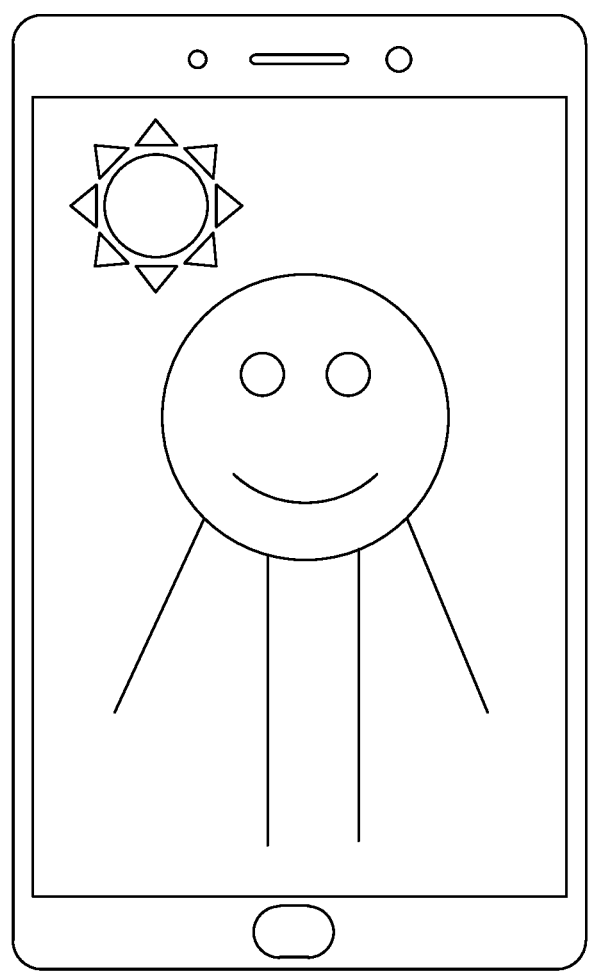
FIG. 3 is a schematic diagram of an image superimposed with a special effect according to an embodiment.

In this embodiment, the original images may be understood to be images obtained directly through the camera, i.e., images without superposed any special effect during a process of shooting a video. In this embodiment, when a camera is used for shooting, a beautifying effect in an electronic device integrated with the camera is not initialized. In this embodiment, in order to ensure recognition accuracy of brightness corresponding to the original images output by the camera, the first frame image needs to be directly acquired from the original images continuously output by the camera. Generally speaking, the special effect may be understood as a special effect to beautify an image, or add an additional gadget, such as a small hat, a weather symbol and etc. on the image. FIG. 2 is a schematic diagram of an image without superimposed a special effect according to an embodiment. As shown in FIG. 2, one frame image is extracted from the original images continuously output by the camera, and this frame image is an original image which is not superposed with any special effect and does not start the beautifying effect. FIG. 3 is a schematic diagram of an image superimposed with a special effect according to an embodiment. As shown in FIG. 3, the special effect of the weather symbol, such as a sunny day, is superimposed on this frame image. In this embodiment, the above descriptions are merely illustrative for an image superimposed with a special effect, which is not intended to be any limitation. In an actual operation process that a user shoots an image through a shooting device, the camera may determine according to the acquired image.

In this embodiment, the first frame image may be understood as a first frame image output by the camera. In a shooting process of the camera, the shooting device integrated with the camera continuously outputs original images, which are basically uniform and stable. In general, one frame image may be identified and acquired from the original images output by the camera using software, for example, the original images output by the camera are read and each frame image of the original images is identified and acquired so as to extract a specified frame image by a programming tool, such as an OpenCV and a Matlab. For example, the specified frame image may be the first frame image or an image to be measured acquired at a preset time interval. In this embodiment, when the first frame image of the original images is identified and acquired, the first frame image may be extracted from the original images in the above-mentioned manner. Generally speaking, the images cover static pictures and dynamic pictures, which have a wide range, and it may also be understood that not only static pictures, but also dynamic small videos are included; but a picture may only be static and has a narrow range. In this embodiment, the original images may include static pictures or dynamic pictures, namely, the original images may be dynamic small videos, while the first frame image only includes a static picture, i.e., one frame image is one static picture.

In step 120, it is determined whether to perform a brightness compensation on the camera according to a brightness value of the first frame image and a brightness threshold range.

In this embodiment, the brightness value may be understood as a parameter for measuring brightness and darkness degree of an image. For ease of understanding, the brightness value of a frame image may be normalized, i.e., it is assumed that the brightness value is divided into 10 levels, such as level 1, level 2, level 3, level 4, level 5, level 6, level 7, level 8, level 9, and level 10. When brightness values of images are different levels, brightness and darkness degrees corresponding to the images are completely different. In this embodiment, when the brightness value has a higher level, it indicates that the corresponding image is brighter. Exemplarily, if the brightness value of the first frame image is level 10, it indicates that the first frame image is the brightest, while if the brightness value of the first frame image is level 1, it indicates that the first frame image is the darkest.

In this embodiment, the brightness compensation may be understood to adaptively adjust the brightness of the first frame image according to a relation between the brightness value of the first frame image and the brightness threshold range. In general, due to a light reason, the original images output by the camera may have a color deviation caused by an unbalanced light, and in order to counteract the color deviation existing in a frame image, the brightness of all pixels in the frame image is adjusted, so that light of each frame image is balanced.

In this embodiment, the brightness threshold range is determined according to a scene corresponding to which the camera continuously outputs the original images. In this embodiment, the corresponding scene may be understood as a shooting environment where the camera is located. In this embodiment, a frame rate of the original images continuously output by the camera is related to the shooting environment, when the shooting environment is relatively dark, the frame rate of the output original images is relatively low, and when the shooting environment is relatively bright, the frame rate of the output original images is relatively high. The frame rate is used as a metric of a number of displayed frames with a so-called measurement unit as a number of displayed frames per second. In this embodiment, the shooting device may output about 30 frame images in each second, namely, one frame image is output in about every 33 milliseconds (ms). It should be noted here that the frame rate of a video shot by the camera is different under different shooting environments. For example, when the shooting environment is switched from indoor to outdoor, the frame rate of the output original images is increased, and when the shooting environment is switched from the outdoor to the indoor, the frame rate of the output original images is reduced. It should be appreciated that the darker the light, the lower the frame rate of the output original images.

In this embodiment, the brightness threshold range is also related to the shooting environment. In this embodiment, when the shooting environment is relatively bright, the scene corresponding to which the camera continuously outputs the original images is also relatively bright; and when the shooting environment is relatively dark, the scene corresponding to which the camera continuously outputs the original images is relatively dark, so that a minimum brightness threshold value of the brightness threshold value range corresponding to a bright shooting environment is larger than a minimum brightness threshold value corresponding to a dark shooting environment. Exemplarily, it is assumed that the scene corresponding to which the camera continuously outputs the original images is at night, the minimum brightness threshold of the brightness threshold range may be 1, and a maximum brightness threshold of the brightness threshold range is 3; when it is assumed that a scene corresponding to which the camera continuously outputs the original images is an outdoor sunny day, the minimum brightness threshold of the brightness threshold range may be 7, and the maximum brightness threshold is 9.

In this embodiment, the brightness threshold range may be understood as a range between the maximum brightness threshold and the minimum brightness threshold of the frame image. The brightness threshold range includes the maximum brightness threshold and the minimum brightness threshold of the frame image. In this embodiment, when the brightness value of the first frame image is greater than the maximum brightness threshold, it indicates that the brightness value of the first frame image is too high, and the brightness value of the first frame image needs to be reduced so as to conform to a corresponding shooting environment, and when the brightness value of the first frame image is less than the minimum brightness threshold value, it indicates that the brightness value of the first frame image is too low, and the brightness value of the first frame image needs to be increased so as to conform to the corresponding shooting environment.

In general, when the brightness compensation is performed on the image, the brightness of the image may be adjusted in following two manners. In one manner, a lens parameter of the camera in the shooting device is adjusted to enable an adjustment of the brightness of the image; and in the other manner, a parameter of the shot image is modified to enable the adjustment of the brightness of the image. In the first manner, the brightness of the image is adjusted by directly adjusting an exposure time and/or an exposure degree of a lens of the camera in the shooting device; in the second manner, a corresponding brightness value is determined according to the shooting environment corresponding to the output original images, and parameters of the acquired image, such as the brightness of the image and a definition of the image, are adjusted according to the determined brightness value so as to perform the brightness compensation on an image to be measured. In an embodiment, when the brightness compensation is performed on the image, the user may directly and manually adjust the exposure time and/or exposure degree of the camera, and may also directly and manually modify the parameters of the image so as to adjust the brightness and definition of the image. In this embodiment, the lens parameter of the camera is adjusted to implement the brightness compensation.

Figure 4:
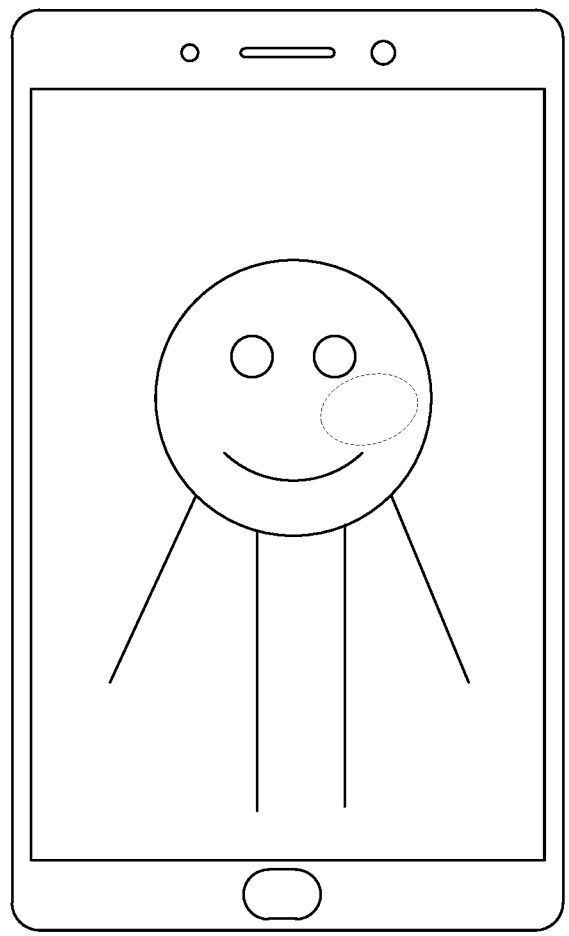
FIG. 4 is a schematic diagram of an image to be measured according to an embodiment.
Figure 5:
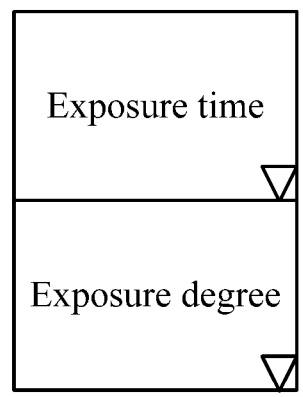
FIG. 5 is a schematic diagram of an option box according to an embodiment.

Exemplarily, FIG. 4 is a schematic diagram of an image to be measured according to an embodiment. Based on FIG. 2, FIG. 4 illustrates a brightness detection and the brightness compensation performed on an image without superposed a special effect. As shown in FIG. 4, it is assumed that a brightness adjustment is performed on a face region, the user needs to put a frame image shown in FIG. 4 into an editing mode, then the user may click a position where the face is located through a finger. In this embodiment, in order to represent the face region, the face region in FIG. 4 is circled with a dashed box so that the brightness compensation performed on the face region of the person may be clearly viewed. FIG. 5 is a schematic diagram of an option box according to an embodiment. After the user clicks on the position where the face is located, the option box as shown in FIG. 5 will be popped up. As shown in FIG. 5, a corresponding setting parameter, such as the exposure time of the camera, or the exposure degree of the camera, is set in each option box, and a pull-down menu is set at a lower right corner of each option box, so that the user may directly select a corresponding numerical value from the pull-down menu to adjust parameter information of the camera.

In an embodiment, the step in which it is determined whether to perform the brightness compensation on the camera according to the brightness value of the first frame image and the brightness threshold range includes steps described below. If the brightness value of the first frame image is outside the brightness threshold range, the brightness compensation is performed on the camera; and if the brightness value of the first frame image is within the brightness threshold range, no brightness compensation is performed on the camera. In this embodiment, outside the brightness threshold range may be understood as the brightness value of the first frame image to be greater than the maximum brightness threshold or less than the minimum brightness threshold. Within the brightness threshold range may be understood as the brightness value of the first frame image to be larger than the minimum brightness threshold and less than the maximum brightness threshold. In this embodiment, when the brightness value of the first frame image is greater than the maximum brightness threshold, it indicates that the brightness value of the original images output by the camera is too high, and the brightness value of the first frame image acquired from the original images needs to be reduced to conform to the corresponding shooting environment; and when the brightness value of the first frame image is less than the minimum brightness threshold value, it indicates that the brightness value of the original images output by the camera is too low, and the brightness value of the first frame image acquired from the original images needs to be increased to conform to the corresponding shooting environment. In this embodiment, if the brightness value of the first frame image is within the brightness threshold range, it indicates that the brightness value of the original images output by the camera conforms to the corresponding shooting environment, no brightness compensation is performed on the camera.

In step 130, it is repeatedly continued to acquire an image to be measured output by the camera after a preset time interval and determined whether to perform the brightness compensation on the camera according to a brightness value of the image to be measured and the brightness threshold range, until the camera stops outputting the original images.

In this embodiment, the preset time interval is greater than or equal to 1 second and less than or equal to 2 seconds.

In an embodiment, after one frame image to be measured is acquired, a next acquired frame image to be measured is related to whether a frame rate fluctuation occurs on the original images output by the camera. In this embodiment, it is determined whether the frame rate fluctuation occurs on the original images according to a preset frame interval. In an embodiment, average frame intervals of images with different frame numbers in the past are calculated respectively, if a difference between the average frame intervals of the images with the different frame numbers is greater than a preset difference, it is considered that the frame rate fluctuation occurs. For example, the average frame intervals of past 10 frames and 3 frames are calculated respectively, if the average frame intervals of the past 10 frames and 3 frames are significantly different (that is, the difference between the average frame interval of the past 10 frames and the average frame interval of 3 frames is greater than the preset difference), it is considered that the frame rate fluctuation occurs.

Two different manners may be adopted to determine whether the frame rate fluctuation occurs. In one manner, an average frame interval is compared and analyzed relative to the preset frame interval. In the other manner, a frame interval of continuous multiple frame images is compared and analyzed relative to the preset frame interval. In the first manner, historical multiple frame images are acquired from the original images, and frame intervals between every two adjacent frame images of the historical multiple frame images are acquired to calculate the average frame interval of the historical multiple frame images, and then the average frame interval is compared and analyzed relative to the preset frame interval to determine whether the frame rate fluctuation occurs on the original images. If there is a significant difference between the average frame interval and the preset frame interval, it is considered that the frame rate fluctuation occurs on the original images; and if there is no significant difference between the average frame interval and the preset frame interval, it is considered that no frame rate fluctuation occurs on the original images. As an example and not limitation, in this embodiment, the preset frame interval between two adjacent frame images is about 33 ms, and the average frame interval of historical 10 frame images is calculated, if the calculated average frame interval is much less than or greater than 33 ms, it is considered that the frame rate fluctuation occurs on the original images. In the second manner, continuous multiple frame images are acquired from the original images, and frame intervals corresponding to every two adjacent frame images of the continuous multiple frame images are acquired, and the frame intervals corresponding to every two adjacent frame images of continuous multiple frame images are compared with the preset frame interval, if there is a significant difference between the frame intervals corresponding to every two adjacent frame images of the continuous multiple frame images and the preset frame interval, it is considered that the frame rate fluctuation occurs on the original images; and if the difference between the frame interval corresponding to every two adjacent frame images of the continuous multiple frame images and the preset frame interval is less than the preset time threshold, it is considered that no frame rate fluctuation occurs on the original images. Exemplarily, it is assumed that 3 continuous frame images are acquired from the original images, and frame intervals between every two adjacent frame images are 45 ms and 23 ms, respectively, since frame intervals between every two adjacent frame images of the 3 continuous frame images are much larger than 33 ms, or much less than 33 ms, it indicates that the frame rate fluctuation occurs on the original images.

In an embodiment, the above-mentioned method further includes steps described below. In response to an occurrence of a first frame rate fluctuation on the original images output by the camera during the preset time interval after a $n^{th}$ image to be measured is acquired under a normal condition, an image acquired from a next frame output by the camera at the first frame rate fluctuation is served as a $(n+1)^{th}$ image to be measured, and a time point corresponding to the image output from the next frame is served as a starting point of the preset time interval after the $(n+1)^{th}$ image to be measured, where the $n^{th}$ image to be measured is referred to as a normal image to be measured, the $(n+1)^{th}$, image to be measured is referred to as an image to be measured of a frame rate fluctuation, and n is a natural number greater than 0.

In this embodiment, the normal condition refers to a condition that when a next acquired frame image to be measured after a frame image to be measured is acquired is an original image output by the camera through the preset time interval since a time point corresponding to the previous acquired frame image to be measured, that is, an interval between a time point corresponding to the next frame image to be measured and the time point corresponding to the previous frame image to be measured is the preset time interval.

In an embodiment, in order to make the acquired image to be measured to be representative, when the frame rate fluctuation occurs on the original images output by the camera, a next frame image of a current frame image corresponding to the occurrence of the frame rate fluctuation is identified and acquired to serve the image output from the next frame as a next acquired image to be measured. In this embodiment, in order to avoid that a time interval between two acquired adjacent images to be measured is too short, the preset time interval is set to be a value greater than or equal to 1 second, for example, the preset time interval is 1 s.

Figure 6:
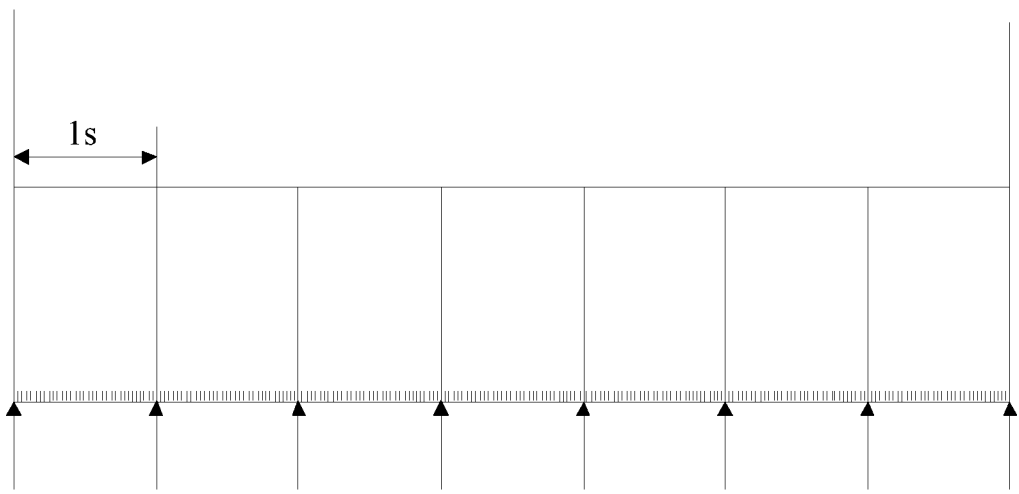
FIG. 6 is a schematic diagram of another image to be measured according to an embodiment.

Exemplarily, FIG. 6 is a schematic diagram of acquiring an image to be measured according to an embodiment. As shown in FIG. 6, the first frame image and the image to be measured are acquired from the original images output by the camera, and the preset time interval is set as 1000 ms. In this embodiment, each second video contains multiple frame images. In this embodiment, an acquisition of the image to be measured will be described by taking a camera that may output 33 frame images within 1 second as an example. Firstly, the first frame image acquired from the original images is an image to be measured, and images to be measured are acquired with the preset time interval of 1000 ms, until the camera stops outputting the original images.

Figure 7:
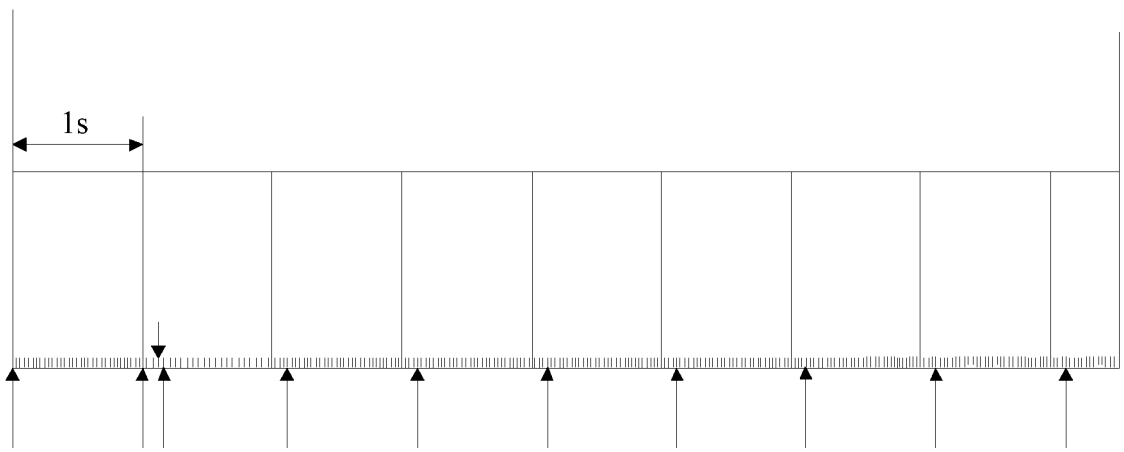
FIG. 7 is a schematic diagram of acquiring an image to be measured according to an embodiment.

In an embodiment, in a process of acquiring an image to be measured, there is a case where a frame rate fluctuation occurs on the original images output by the camera. Exemplarily, FIG. 7 is a schematic diagram of acquiring another image to be measured according to an embodiment. As shown in FIG. 7, the first frame image is acquired from the original images output by the camera, the preset time interval is set as 1000 ms, and the acquisition of the image to be measured will be described by taking a camera that may output 33 frame images within 1 second as an example. For example, after the first frame image is acquired as a $1^{st}$ image to be measured, no frame rate fluctuation occurs on the original images output by the camera during the preset time interval (within a first second) after the $1^{st}$ image to be measured. Therefore, an original image output by the camera at the first second is acquired as a $2^{nd}$ image to be measured, and the $2^{nd}$ image to be measured is a normal image to be measured. A frame rate fluctuation occurs on the original images output by the camera during the preset time interval (within a second second) after the $2^{nd}$ image to be measured, and the frame rate fluctuation occurs on a fourth frame image within the second second, and then a fifth frame image within the second second is served as a $3^{rd}$ image to be measured, and the $3^{rd}$ image to be measured is an image to be measured of a frame rate fluctuation, and a time point corresponding to the $3^{rd}$ image to be measured is served as a starting point of the preset time interval after the $3^{rd}$ image to be measured. As shown in FIG. 7, no frame rate fluctuation occurs on the original images output by the camera during the preset time interval using the time point corresponding to the $3^{rd}$ image to be measured as the starting point. Therefore, an original image output by the camera through the preset time interval after the $3^{rd}$ image to be measured is served as a $4^{th}$ image to be measured, where the $4^{th}$ image to be measured is a normal image to be measured, and a time point corresponding to the $4^{th}$ image to be measured is served as a starting point of the preset time interval after the $4^{th}$ image to be measured, and so on, until the camera stops outputting the original images.

In this embodiment, the occurrence of the first frame rate fluctuation on the original images output by the camera during the preset time interval after the $n^{th}$ image to be measured refers to that: if an occurrence of the frame rate fluctuation on the original images output by the camera during this preset time interval is detected, it is considered that the occurrence of the first frame rate fluctuation on the original images output by the camera during this preset time interval is detected, where the $n^{th}$ image to be measured is a normal image to be measured.

In an embodiment, an interval between two acquired adjacent frame images to be measured should not be too small, that is, it should be avoided that the two acquired adjacent frame images to be measured are respectively next frame images output by the camera at two frame rate fluctuations that occur on the original images output by the camera in a relatively close interval. Therefore, in an embodiment, after an image acquired from the next frame output by the camera at the first frame rate fluctuation is served as the $(n+1)^{th}$ image to be measured, and the time point corresponding to the image output from the next frame is served as the starting point of the preset time interval after the $(n+1)^{th}$ image to be measured, the method further includes steps described below. In response to determining that a second frame rate fluctuation occurs on the original images output by the camera during the preset time interval after the $(n+1)^{th}$ image to be measured, and that a time interval between the second frame rate fluctuation and the first frame rate fluctuation is greater than a predetermined minimum time interval, an image acquired from the next frame output by the camera at the second frame rate fluctuation is served as a $(n+2)^{th}$ image to be measured, and a time point corresponding to the image output from the next frame at the second frame rate fluctuation is served as a starting point of the preset time interval after the $(n+2)^{th}$ image to be measured, where the $(n+2)^{th}$ image to be measured is an image to be measured of a frame rate fluctuation; in response to determining that at least one frame rate fluctuation occurs on the original images output by the camera during the preset time interval after the $(n+1)^{th}$ image to be measured, and that a time interval between each frame rate fluctuation of the at least one frame rate fluctuation and first frame rate fluctuation is less than or equal to the predetermined minimum time interval, an original image output by the camera through the preset time interval after the $(n+1)^{th}$ image to be measured is acquired and served as a $(n+2)^{th}$ image to be measured, and a time point corresponding to the $(n+2)^{th}$ image to be measured is served as a starting point of the preset time interval after the $(n+2)^{th}$ image to be measured, where the $(n+2)^{th}$ image to be measured is a normal image to be measured; or in response to determining that no frame rate fluctuation occurs on the original images output by the camera during the preset time interval after the $(n+1)^{th}$ image to be measured, an original image output by the camera through the preset time interval after the $(n+1)^{th}$ image to be measured is acquired and served as a $(n+2)^{th}$ image to be measured, and a time point corresponding to the $(n+2)^{th}$ image to be measured is served as a starting point of the preset time interval after the $(n+2)^{th}$ image to be measured, where the $(n+2)_{th}$ image to be measured is a normal image to be measured.

In this embodiment, the predetermined minimum time interval is less than the preset time interval.

Figure 8:
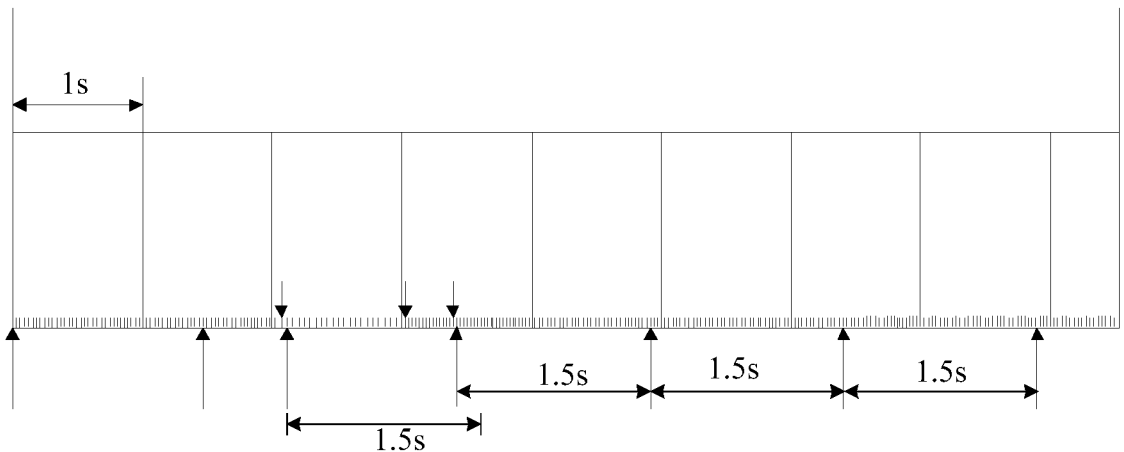
FIG. 8 is a schematic diagram of acquiring another image to be measured according to an embodiment.

FIG. 8 is a schematic diagram of acquiring another image to be measured according to an embodiment. In this embodiment, the preset time interval is 1.5 s, and the predetermined minimum time interval is 1 s. As shown in FIG. 8, in this embodiment, the acquisition of an image to be measured will be described by taking a camera that may output 33 frame images within one second as an example. After the first frame image of the original images output by the camera is acquired as a $1^{st}$ image to be measured, no frame rate fluctuation occurs on the original images output by the camera during the preset time interval (during a first 1.5 seconds) after the Pt image to be measured, and thus the original images output by the camera at the first 1.5 seconds is acquired as a $2^{nd}$ image to be measured, where the $2^{nd}$ image to be measured is a normal image to be measured, a frame rate fluctuation on the original images output by the camera is detected during the preset time interval (from the first 1.5 seconds to a second 1.5 seconds) after the $2^{nd}$ image to be measured, i.e., it is the first frame rate fluctuation, the frame rate changes from 33 frame/ms to 23 frame/ms within a third second, and the frame rate fluctuation occurs on a third frame image within the third second, then a fourth frame image within the third second is acquired as a $3^{rd}$ image to be measured, and a time point corresponding to the $3^{rd}$ image to be measured is served as a starting point of the preset time interval after the $3^{rd}$ image to be measured, and the $3^{rd}$ image to be measured is an image to be measured of a frame rate fluctuation; during the preset time interval after the $3^{rd}$ image to be measured, the frame rate fluctuation occurs again on the original images output by the camera within a fourth second, and the frame rate fluctuation occurs on a first frame image and a fifteenth frame image within the fourth second. Since a time interval between the frame rate fluctuation of the $1^{st}$ frame image within the fourth second and the first frame rate fluctuation during the previous preset time interval is less than the predetermined minimum time interval (for example, 1 s), and even if a second frame image within the fourth second is representative, the second frame image within the fourth second is not acquired at this time. Since the time interval between the frame rate fluctuation of the fifteenth frame image within the fourth second and the first frame rate fluctuation during the previous preset time interval is greater than the predetermined minimum time interval, that is, it is determined that the second frame rate fluctuation occurs on the original images output by the camera, therefore a sixteenth frame image within the fourth second is acquired as a $4^{th}$ image to be measured, and the $4^{th}$ image to be measured is an image to be measured of a frame rate fluctuation. A time point corresponding to the $4^{th}$ image to be measured is served as a starting point of the preset time interval after the $4^{th}$ image to be measured.

Figure 9:
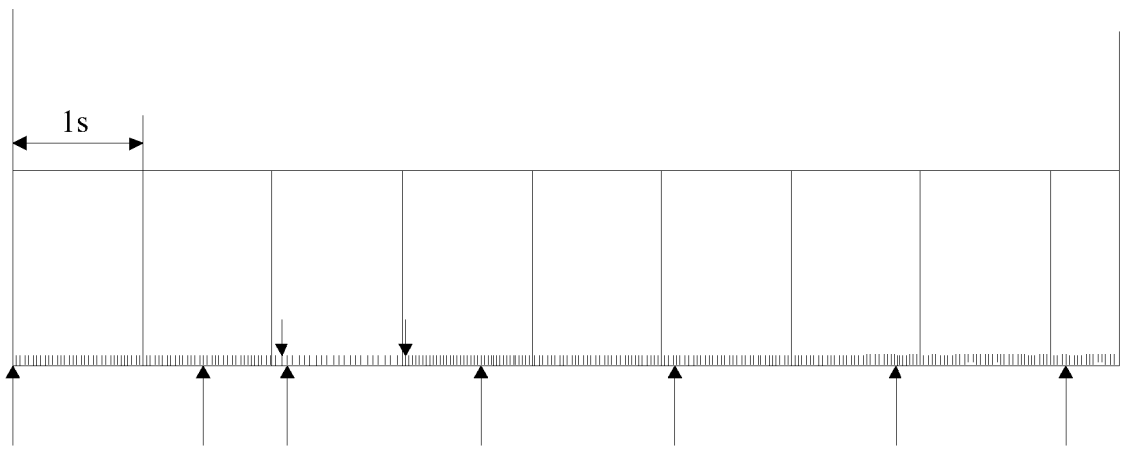
FIG. 9 is a schematic diagram of acquiring another image to be measured according to an embodiment.

FIG. 9 is schematic diagram of acquiring another image to be measured according to an embodiment. As shown in FIG. 9, which is the same as FIG. 8, in this embodiment, the preset time interval is 1.5 s, and the predetermined minimum time interval is 1 s. In FIG. 9, processes of acquiring a $1^{st}$ image to be measured, a $2^{nd}$ image to be measured, and a $3^{rd}$ image to be measured are the same as that in FIG. 8, which will not be repeated herein again. After the $3^{rd}$ image to be measured is acquired, the $3^{rd}$ image to be measured is an image to be measured of a frame rate fluctuation. As shown in FIG. 9, during the preset time interval after the $3^{rd}$ image to be measured, a frame rate fluctuation occurs again on the original images output by the camera within the fourth second, and the frame rate fluctuation occurs on a first frame image within the fourth second. Since the time interval between the frame rate fluctuation on the first frame image within the fourth second and the first frame rate fluctuation within the previous preset time interval is less than the predetermined minimum time interval, an original image output by the camera through the preset time interval after the $3^{rd}$ image to be measured is acquired as a $4^{th}$ image to be measured, and the $4^{th}$ image to be measured is a normal image to be measured, and a time point corresponding to the $4^{th}$ image to be measured is served as a starting point of the preset time interval after the $4^{th}$ image to be measured. In an embodiment, if multiple frame rate fluctuations occur on the original images output by the camera during the preset time interval after the $3^{rd}$ image to be measured, and the time interval between each frame rate fluctuation of the multiple frame rate fluctuations and the first frame rate fluctuation within the previous preset time interval is less than the predetermined minimum time interval, or if no frame rate fluctuation occurs on the original images output by the camera during the preset time interval after the $3^{rd}$ image to be measured, an original image output by the camera through the preset time interval after the $3^{rd}$ image to be measured is acquired as a $4^{th}$ image to be measured, and the $4^{th}$ image to be measured is a normal image to be measured.

In this embodiment, the step in which it is determined whether to perform the brightness compensation on the camera according to the brightness value of the image to be measured and the brightness threshold range includes steps described below, If the brightness value of the image to be measured is outside the brightness threshold range, the brightness compensation is performed on the camera; and if the brightness value of the image to be measured is within the brightness threshold range, no brightness compensation is performed on the camera. In this embodiment, explanations on "outside the brightness threshold range" and "within the brightness threshold range" refer to the description of the above-mentioned steps, which will not be repeated herein again. An image to be measured output by the camera is acquired after the preset time interval, and also a brightness value of the image to be measured is acquired, so as to determine whether to perform the brightness compensation on the camera according to a comparison result between the brightness value of the image to be measured and the brightness threshold range, until the camera stops outputting the original images. In this embodiment, in terms of a process of comparing the brightness value of the image to be measured with the brightness threshold range may refer to the above descriptions of the comparison between the brightness value of the first frame image and the brightness threshold range, which will not be repeated herein again.

In an embodiment, when a video audit is performed on the image to be measured, the extracted image to be measured needs to be compressed and packed, and a compressed package of the image to be measured is uploaded to a back-office server, so that a corresponding machine in the back-office server automatically handle the image to be measured to determine whether a video corresponding to the original images output by the camera meets a preset standard. If it meets the preset standard, it is saved for subsequent machine learning; and if it does not meet the preset standard, the image to be measured is checked manually. Exemplarily, the preset standard may include that the brightness of an image need to reach level 6, the frame rate of the output original images needs to reach 33 frame/s, and etc., which is not limited, and a user may set the preset standard according to his own needs. Similarly, when the brightness of the shooting environment is detected through the image to be measured, it is necessary to identify a scene corresponding to the image to be measured first and determine whether the brightness of the image to be measured is matched with the brightness of the corresponding scene. If the brightness of the image to be measured is matched with the brightness of the corresponding scene, no brightness compensation is performed on the image to be measured; and if the brightness of the image to be measured is not matched with the brightness of the corresponding scene, the brightness compensation is performed on the image to be measured according to a relationship between the brightness value of the image to be measured and the brightness threshold range. Exemplarily, If the shooting environment corresponding to the camera is identified as indoor, then it is determined whether the brightness of the image to be measured conforms to this shooting environment; similarly, if the shooting environment corresponding to the camera is identified as cloudy, it is determined whether the brightness of the image to be measured conforms to a cloudy shooting environment. In general, shooting environments have many different scenes, which will not be limited here. When the shooting environments are different, corresponding requirements for brightness of images are also different.

In an embodiment of the present disclosure, when the camera continuously outputs the original images, the first frame image output by the camera is acquired; it is determined whether to perform the brightness compensation on the camera according to the brightness value of the first frame image and the brightness threshold range; and it is repeatedly continued to acquire the image to be measured output by the camera after the preset time interval and determined whether to perform the brightness compensation on the camera according to the brightness value of the image to be measured and the brightness threshold range, until the camera stops outputting the original images. So that the images output by the camera are preprocessed before a video is generated, thus the brightness of the original images is improved, and the use experience of the users is improved.

Figure 10:
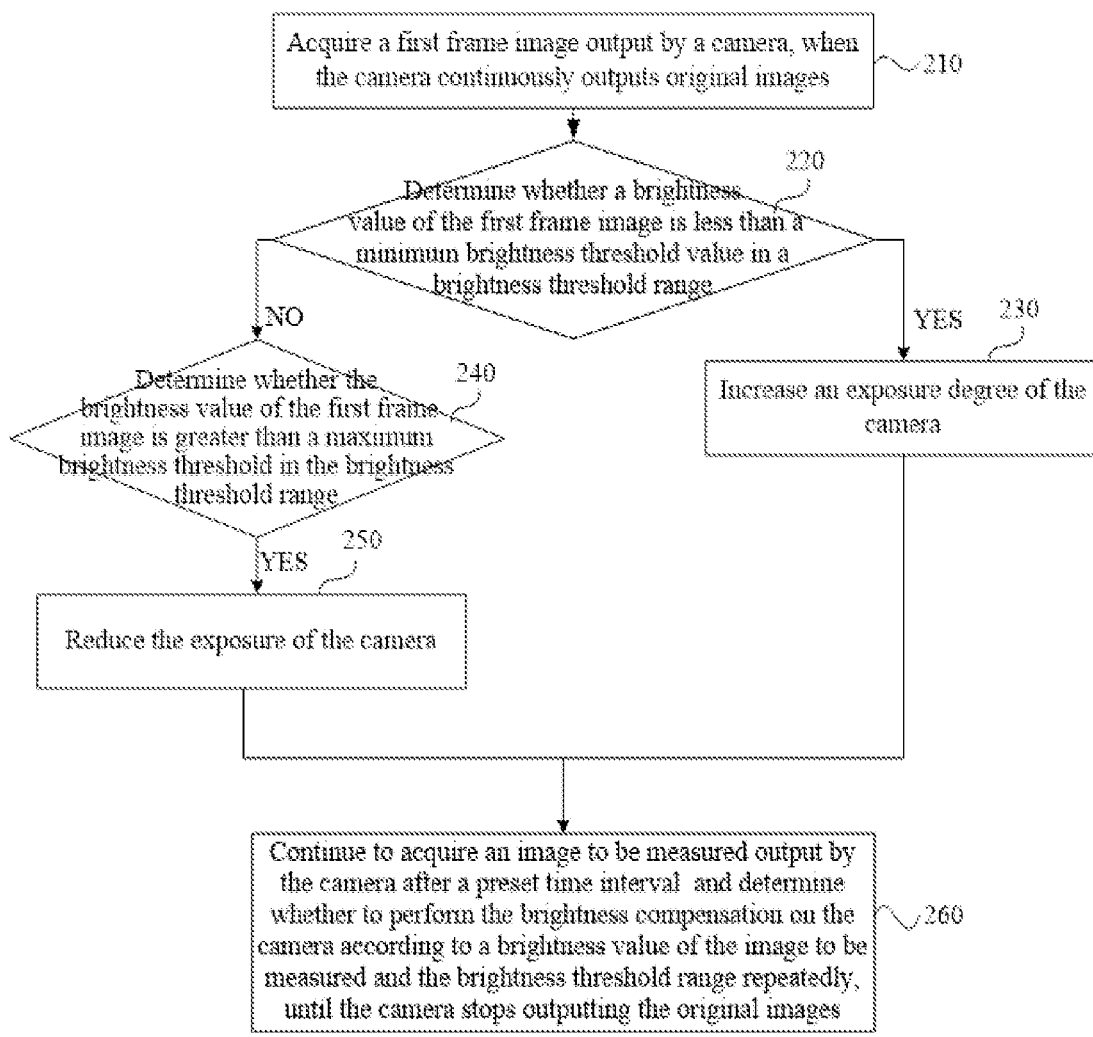
FIG. 10 is a flowchart of another image processing method according to an embodiment.

FIG. 10 is a flowchart of another image processing method according to an embodiment. This embodiment is a description of the image processing method based on the above embodiments. Referring to FIG. 10, the image processing method of this embodiment includes steps described below.

In step 210, when a camera continuously outputs original images, a first frame image output by the camera is acquired.

In step 220, it is determined whether a brightness value of the first frame image is less than a minimum brightness threshold value of a brightness threshold range. If the brightness value of the first frame image is less than the minimum brightness threshold value of the brightness threshold range, step 230 is executed; if the brightness value of the first frame image is not less than the minimum brightness threshold of the brightness threshold range, step 240 is executed to determine whether the brightness value of the first frame image is greater than a maximum brightness threshold of the brightness threshold range. If yes, step 250 is executed. In this embodiment, the minimum brightness threshold and the maximum brightness threshold of the brightness threshold range are related to a scene corresponding to the first frame image. When the brightness value of the first frame image is less than the minimum brightness threshold of the brightness threshold range, it indicates that the original images output by the camera are in a relatively dark scene. Since the first frame image is too dark, a lens parameter of the camera needs to be adjusted to increase the brightness value of the original images output by the camera, that is, step 230 is executed; when the brightness value of the first frame image is greater than the maximum brightness threshold of the brightness threshold range, it indicates that the original images output by the camera are in a relatively bright scene, but the first frame image is too bright, the lens parameter of the camera needs to be adjusted to reduce the brightness value of the original images output by the camera, that is, step 250 is executed.

In step 230, an exposure degree of the camera is increased.

In this embodiment, if the brightness value of the first frame image is less than the minimum value of the brightness threshold range, the exposure degree of the camera is increased. In this embodiment, the exposure degree of the camera and an exposure value in the camera are in one-to-one correspondence, the exposure value is represented by a group of numerical values matched and combined by an aperture value and a shutter speed value according to certain standard requirements, and the exposure value refers to a numerical value representing light transmission capability of a lens of the camera. In general, the greater the exposure degree, the larger the exposure value in the corresponding camera, and the smaller the exposure degree, the smaller the exposure value in the corresponding camera. In this embodiment, when the brightness of the shooting environment is detected, the exposure time or exposure compensation, and etc. of the camera may be automatically adjusted by identifying the brightness value of the first frame image to adjust the brightness value of the original images output by the camera. In this embodiment, the exposure compensation is an exposure control manner, which generally is about plus or minus 2 to plus or minus 3 exposure value (EV). If the shooting environment corresponding to the original images output by the camera is relatively dark, the exposure value may be increased (for example, adjusted to plus 1 EV or plus 2 EV) to highlight the definition of the output original images. In an embodiment, when the brightness value of the first frame image is less than the minimum brightness threshold value of the brightness threshold range, it indicates that the shooting environment is relatively dark, so the exposure value needs to be increased when the exposure compensation is performed on the first frame image. The exposure value is increased by 1.0 each time, which is equivalent to increase an incoming light amount by one time, so that the light of the original images output by the camera is balanced.

In this embodiment, the exposure time is time required for a shutter to be opened for projecting the light onto a photosensitive surface of a photographic photosensitive material, and the exposure time is generally determined according to a sensitivity of the photographic photosensitive material and an illumination on a photosensitive surface. In general, the longer the exposure time, the more light entering the lens of the camera, which is suitable for a case that a light condition is poor; and the shorter the exposure time, the less light entering the lens of the camera, which is suitable for a case that the light condition is good. Generally, it may be divided into a long exposure and a short exposure according to the exposure time. The long exposure refers to an exposure with the exposure time longer than 1 second, and the short exposure refers to an exposure with the exposure time shorter than 1 second. When an image is shot, the image obtained by controlling opening time of the shutter of an electronic device to be greater than 1 second is referred to as a long exposure image; while the image obtained by controlling the opening time of the shutter of the electronic device to be less than 1 second is referred to as a short exposure image.

In a case where light brightness of shooting environments is the same, the brightness of the original images output by shooting with different exposure times is different. Similarly, in a case where the light brightness of the shooting environments is the same, the brightness of the original images output by shooting with a same exposure time is the same or similar. In this embodiment, since the shooting environments corresponding to different frame images in a same video may be different, the images include frame images obtained by using the exposure time at different light brightness. In order to ensure that brightness of the video corresponding to the original images output by the camera reaches a viewing standard for a user, the brightness value of the image needs to be detected, and in a case where the brightness value of the image is less than the minimum brightness threshold value of the brightness threshold range, the brightness value of the image is increased by increasing the exposure value of the camera or extending the exposure time of the camera.

In step 240, it is determined whether the brightness value of the first frame image is greater than the maximum brightness threshold in the brightness threshold range; if yes, step 250 is executed.

In step 250, the exposure degree of the camera is reduced.

In this embodiment, if the brightness value of the first frame image is greater than the maximum brightness threshold of the brightness threshold range, the exposure degree of the camera is reduced. When the brightness value of the first frame image is greater than the maximum brightness threshold of the brightness threshold range, it indicates that the shooting environment is relatively bright. That is, when the brightness compensation is performed on the original images output by the camera, if the original images are too bright, the exposure value needs be reduced, the exposure value is decreased by 1.0 each time, which is equivalently to reduce the incoming light amount by one time, so that the light of the original images is balanced. In another embodiment, the user may perform the adjustment according to compensation intervals of different cameras in a unit of ½ (0.5) or ⅓ (0.3).

In an embodiment, when the brightness value of the first frame image is greater than the maximum brightness threshold of the brightness threshold range, the brightness value of the original images output by the camera may be reduced by reducing the exposure degree of the camera or by shortening the exposure time of the camera. In an embodiment, when the shooting environment has a relatively good light condition, in order to ensure that the brightness of the original images output by the camera is balanced, the exposure time of the camera needs to be shortened so that less light enters the lens of the camera.

In step 260, it is repeatedly continued to acquire an image to be measured output by the camera after a preset time interval and determined whether to perform the brightness compensation on the camera according to a brightness value of the image to be measured and the brightness threshold range, until the camera stops outputting the original images.

In an embodiment, the step in which if the brightness of the image to be measured is outside the brightness threshold range, the brightness compensation is performed on the camera includes steps described below. If the brightness value of the image to be measured is less than the minimum value of the brightness threshold range, the exposure degree of the camera is increased; and if the brightness value of the image to be measured is greater than a maximum value of the brightness threshold range, the exposure degree of the camera is reduced. In this embodiment, the minimum value of the brightness threshold range is the minimum brightness threshold of the brightness threshold range, and the maximum value of the brightness threshold range is the maximum brightness threshold of the brightness threshold range. When the brightness value of the image to be measured is less than the minimum value of the brightness threshold range, it indicates that the brightness value of the original images output by the camera is less than the minimum value of the brightness threshold range, that is, the corresponding shooting environment of the camera is relatively dark, the lens parameter of the camera needs to be adjusted to increase the exposure degree of the camera. When the brightness value of the image to be measured is greater than the maximum value of the brightness threshold range, it indicates that the brightness value of the original images output by the camera is greater than the maximum value of the brightness threshold range, that is, the corresponding shooting environment of the camera is relatively bright, then the lens parameter of the camera is adjusted to reduce the exposure degree of the camera. In this embodiment, an implementation manner of increasing/reducing the exposure degree of the camera is referred to steps described above that the first frame image is determined to adjust the exposure degree of the camera, which will not be repeated herein again.

On the basis of the above embodiments, in the technical schemes of this embodiment, the brightness value of the image is increased/decreased by identifying the brightness value of the image, also comparing and analyzing the brightness value of the image with the brightness threshold range to increase/reduce the exposure degree of the camera to perform the brightness compensate on the original images output by the camera, so that the light of the original images output by the camera is balanced, and then the brightness of the corresponding video is adjusted according to the original images after the brightness compensation is performed, such that the video brightness is balanced and the viewing experience of the users is improved.

Figure 11:
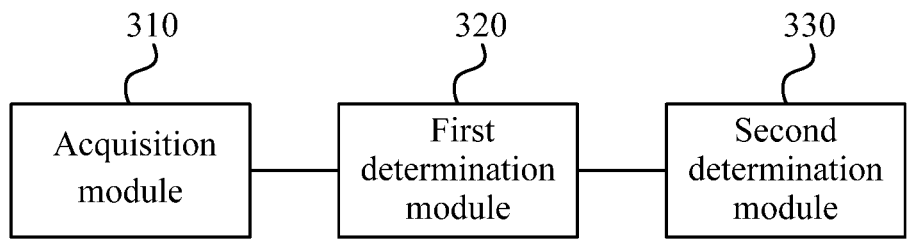
FIG. 11 is a structural block diagram of an image processing apparatus according to an embodiment.

FIG. 11 is a structural block diagram of a video processing apparatus according to an embodiment. This embodiment is applicable to a case of improving a video brightness. The apparatus may be implemented by using software and/or hardware. The apparatus may be configured in an electronic device, such as a mobile phone, a tablet computer and a computer. As shown in FIG. 11, the device includes an acquisition module 310, a first determination module 320 and a second determination module 330. In this embodiment, the acquisition module 310 is configured to acquire a first frame image output by a camera when the camera continuously outputs original images. The first determination module 320 is configured to determine whether to perform a brightness compensation on the camera according to a brightness value of the first frame image and a brightness threshold range. The second determination module 330 is configured to: continue to acquire an image to be measured output by the camera after a preset time interval and determine whether to perform the brightness compensation on the camera according to a brightness value of the image to be measured and the brightness threshold range it is repeatedly, until the camera stops outputting the original images.

In the technical schemes of this embodiment, when the camera continuously outputs the original images, the first frame image output by the camera is acquired; it is determined whether to perform the brightness compensation on the camera according to the brightness value of the first frame image and the brightness threshold range; and it is repeatedly continued to acquire the image to be measured output by the camera after a preset time interval and determined whether to perform the brightness compensation on the camera according to the brightness value of the image to be measured and the brightness threshold range, until the camera stops outputting the original images. So that the images output by the camera are preprocessed before a video is generated, thus the brightness of the original images is improved, and the use experience of the users is improved.

In an embodiment, the image processing apparatus further includes a first determination acquisition module, which is configured to: in response to an occurrence of a first frame rate fluctuation on the original images output by the camera during the preset time interval after a n' image to be measured acquired under a normal condition, an image acquired from a next frame output by the camera at the first frame rate fluctuation is served as a $(n+1)^{th}$ image to be measured, and a time point corresponding to the image output from the next frame is served as a starting point of the preset time interval after the $(n+1)^{th}$ image to be measured, where the $n^{th}$ image to be measured is referred to as a normal image to be measured, the $(n+1)^{th}$ image to be measured is referred to as an image to be measured of a frame rate fluctuation, and n is a natural number greater than 0.

In an embodiment, the image processing apparatus further includes a second judgment acquisition module, which is configured to: in response to determining that a second frame rate fluctuation occurs on the original images output by the camera during the preset time interval after the $(n+1)^{th}$ image to be measured, and that a time interval between the second frame rate fluctuation and the first frame rate fluctuation is greater than a predetermined minimum time interval, an image acquired from the next frame output by the camera at the second frame rate fluctuation is served as a $(n+2)^{th}$ image to be measured, and a time point corresponding to the image output from the next frame at the second frame rate fluctuation is served as a starting point of the preset time interval after the $(n+2)^{th}$ image to be measured, where the $(n+2)^{th}$ image to be measured is an image to be measured of a frame rate fluctuation; in response to determining that at least one frame rate fluctuation occurs on the original images output by the camera during the preset time interval after the $(n+1)^{th}$ image to be measured, and that a time interval between each frame rate fluctuation of the at least one frame rate fluctuation and first frame rate fluctuation is less than or equal to the predetermined minimum time interval, an original image output by the camera through the preset time interval after the $(n+1)^{th}$ image to be measured is acquired and served as a $(n+2)^{th}$ image to be measured, and a time point corresponding to the $(n+2)^{th}$ image to be measured is served as a starting point of the preset time interval after the $(n+2)^{th}$ image to be measured, where the $(n+2)^{th}$ image to be measured is a normal image to be measured; or in response to determining that no frame rate fluctuation occurs on the original images output by the camera during the preset time interval after the $(n+1)^{th}$ image to be measured, an original image output by the camera through the preset time interval after the $(n+1)^{th}$ image to be measured is acquired and served as a $(n+2)^{th}$ image to be measured, and a time point corresponding to the $(n+2)^{th}$ image to be measured is served as a starting point of the preset time interval after the $(n+2)^{th}$ image to be measured, where the $(n+2^{th}$ image to be measured is a normal image to be measured.

In an embodiment, the first determination module 320 is configured to perform the brightness compensation on the camera, if the brightness value of the first frame image is outside the brightness threshold range; and if the brightness value of the first frame image is within the brightness threshold range, the first determination module 320 is configured to perform no brightness compensation on the camera.

In an embodiment, the second determination module 330 is configured to perform the brightness compensation on the camera, if the brightness value of the image to be measured is outside the brightness threshold range; and if the brightness value of the image to be measured is within the brightness threshold range, the second determination module 330 is configured to perform no brightness compensation on the camera.

In an embodiment, if the brightness value of the first frame image is outside the brightness threshold range, the first determination module 320 is configured to perform the brightness compensation on the camera in a following manner: if the brightness value of the first frame image is less than a minimum value of the brightness threshold range, the exposure degree of the camera is increased; and if the brightness value of the first frame image is greater than a maximum value of the brightness threshold range, the exposure degree of the camera is reduced. If the brightness value of the image to be measured is outside the brightness threshold range, the second determination module 330 is configured to perform the brightness compensation on the camera in a following manner: if the brightness value of the image to be measured is less than the minimum value of the brightness threshold range, the exposure degree of the camera is increased; and if the brightness value of the image to be measured is greater than the maximum value of the brightness threshold range, the exposure degree of the camera is reduced.

In an embodiment, the brightness threshold range is determined according to a scene corresponding to which the camera continuously outputs the original images.

In an embodiment, the preset time interval is greater than or equal to 1 second and less than or equal to 2 seconds. The image processing apparatus provided by this embodiment may execute the image processing method provided by any of the above embodiments, which has corresponding function modules and beneficial effects to execute the method.

Figure 12:
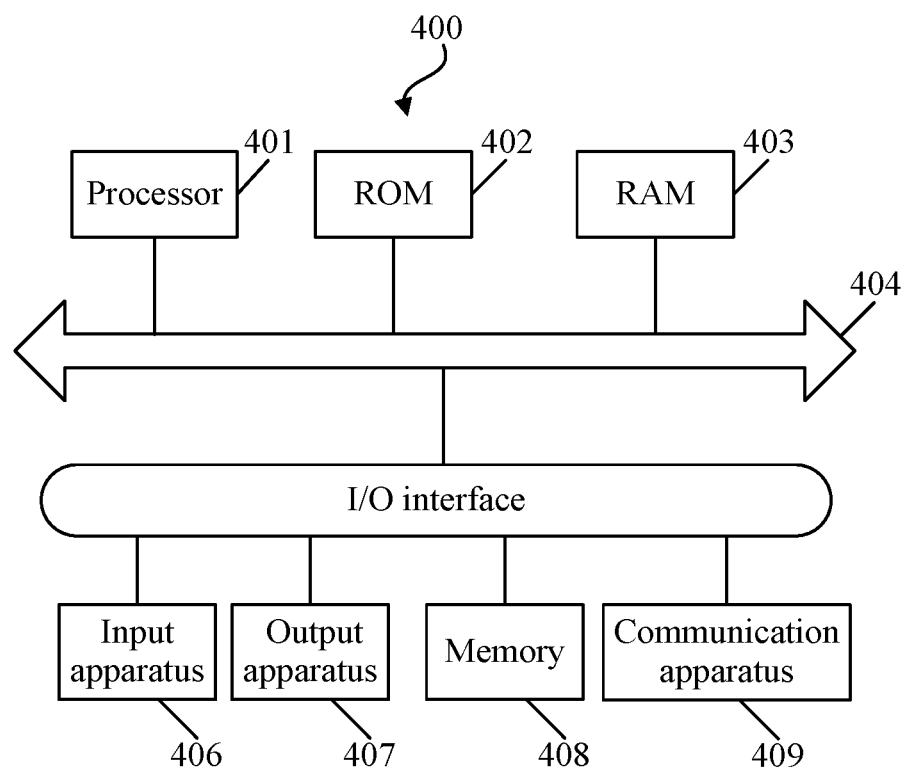
FIG. 12 is a structural block diagram of an electronic device according to an embodiment.

FIG. 12 is a structural block diagram of an electronic device according to an embodiment. Referring to FIG. 12, FIG. 12 shows a schematic structural diagram of the electronic device 400 (such as a terminal device or a server) suitable for implementing the embodiments of the present disclosure. The terminal device in the embodiments of the present disclosure may include, but is not limited to, a mobile terminal such as a mobile phone, a notebook computer, a digital broadcast receiver, a personal digital assistant (PDA), a tablet computer (PAD), a portable media player (PMP), a vehicle terminal (such as a vehicle navigation terminal) etc., and a fixed terminal such as a television (TV), a desktop computer and so on. The electronic device shown in FIG. 12 is merely an example, which should not impose any limitation on the functions and the use scope of the embodiments of the present disclosure.

As shown in FIG. 12, the electronic device 400 may include a processor 401 (for example, a central processing unit, a graphics processor), the processor may perform at least one appropriate action and process based on a program stored in a read-only memory (ROM) 402 or a program loaded into a random access memory (RAM) 403 from a memory 408. In the RAM 403, at least one program and data required for operations of the electronic device 400 are also stored. The processor 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 including such as a touch screen, a touchpad, a keyboard, a mouse, a camera, a microphone, an accelerometer, a gyroscope; an output apparatus 407 including, for example, a liquid crystal display (LCD), a speaker, a vibrator; a memory 408 including such as a magnetic tape, a hard disk; and a communication apparatus 409. The communication apparatus 409 may allow the electronic device 400 to perform a wireless or wired communication with other devices so as to exchange data. Although FIG. 12 shows the electronic device 400 having various apparatuses, in an embodiment, it is not required to implement or have all the devices shown. More or fewer apparatuses may be implemented or had instead.

According to the embodiments of the present disclosure, the process described above with reference to the flowchart may be implemented as a computer software program. For example, an embodiment of the present disclosure includes a computer program product including a computer program borne on a computer-readable medium, the computer program contains program code for performing a method shown in the flowcharts. In such an embodiment, the computer program may be downloaded and installed from the network through the communication apparatus 409, or installed from the memory 408, or installed from the ROM 402. The computer program, when executed by the processor 401, causes the processor 401 to perform the above functions defined in the image processing method of the embodiments of the present disclosure.

The above-described computer-readable medium of the present disclosure may be a computer-readable signal medium, or a computer-readable storage medium, or any combination of the computer-readable signal medium and the computer-readable storage medium. The computer-readable storage medium may be, for example, but not limited to, an electronic, magnetic, optical, electromagnetic, infrared, or semiconductor system, apparatus, or device, or any combination thereof. More examples of the computer-readable storage media may include, but are not limited to: electrical connections with one or more wires, a portable computer magnetic disk, a hard disk, a RAM, a ROM, an erasable programmable read-only memory (EPROM) or a flash, an optical fiber, a compact disc read-only memory (CD-ROM), an optical storage device, a magnetic storage device, or any suitable combination thereof. In the present disclosure, the computer-readable storage medium may be any tangible medium that contains or stores a program, which may be used by or in combination with an instruction execution system, apparatus, or device. In the present disclosure, the computer-readable signal medium may include a data signal that is contained in a baseband or propagated as a part of a carrier wave, and the data signal carries a computer-readable program code. Such a propagated data signal may take many forms, including but not limited to an electromagnetic signal, an optical signal, or any suitable combination thereof. The computer-readable signal medium may also be any computer-readable medium other than the computer-readable storage medium, and the computer-readable signal medium may send, propagate, or transmit a program for being used by or in combination with the instruction execution system, apparatus, or device. The program code contained in the computer-readable medium may be transmitted by using any appropriate medium, including but not limited to an electric wire, an optical cable, a radio frequency (RF), etc., or any suitable combination thereof.

The above-described computer-readable medium may be included in the above-described electronic device, or it may exist alone without being assembled into the electronic device.

The above-described computer-readable medium carries one or more programs, and the above-described one or more programs, when executed by the electronic device, cause the electronic device to perform the following method: when the camera continuously outputs original images, a first frame image output by the camera is acquired; it is determined whether to perform the brightness compensation on the camera according to a brightness value of the first frame image and the brightness threshold range; and it is repeatedly continued to acquire an image to be measured output by the camera after a preset time interval and determined whether to perform the brightness compensation on the camera according to the brightness value of the image to be measured and the brightness threshold range, until the camera stops outputting the original images.

A computer program code for performing the operations of the present disclosure may be written in one or more programming languages or combinations of multiple programming languages, the above-described programming languages include an object-oriented programming language—such as Java, Smalltalk, C++, and further include a conventional procedural programming language—such as a "C" language or similar programming languages. The program code may be executed in a following manner: executed entirely on a user computer, executed partly on a user computer, executed as an independent software package, executed partly on a user computer and partly on a remote computer, or executed entirely on a remote computer or a server. In a case where a remote computer is involved, the remote computer may be connected to the user computer through any kind of network, including a local area network (LAN) or a wide area network (WAN), or may be connected to an external computer (for example, connected to the external computer through an internet provided by an internet service provider).

The flowcharts and block diagrams in the drawings illustrate architecture, functionality, and operation of possible implementations of the system, the method and the computer program product according to various embodiments of the present disclosure. In this regard, each block in the flowcharts or block diagrams may represent a module, a program segment, or a part of codes, which includes one or more executable instructions for implementing a specified logical function. Each block in the block diagrams and/or the flowcharts, and combinations of blocks in the block diagrams and/or the flowcharts may be implemented by a dedicated hardware-based system that performs a specified function or operation, or by a combination of dedicated hardware and a computer instruction.

The units or modules described in the embodiments of the present disclosure may be implemented by software or hardware. The names of the units or modules do not constitute a limitation on the units itself in some cases. For example, the first determination module may also be described as "a module for determining whether to perform the brightness compensation on the camera".

What is claimed is:

1. An image processing method, comprising:
   in a case where a camera continuously outputs original images, acquiring a first frame image output by the camera;
   determining whether to perform a brightness compensation on the camera according to a brightness value of the first frame image and a brightness threshold range; and
   continuing to acquire an image to be measured output by the camera after a preset time interval and determining whether to perform the brightness compensation on the camera according to a brightness value of the image to be measured and the brightness threshold range repeatedly, until the camera stops outputting the original images;
   wherein the method further comprises:
   in response to an occurrence of a first frame rate fluctuation on the original images output by the camera during the preset time interval after an $n^{th}$ image to be measured is acquired under a normal condition, using an image acquired from a next frame output by the camera at the first frame rate fluctuation as an $(n+1)^{th}$ image to be measured, and using a time point corresponding to the image output from the next frame as a starting point of the preset time interval after the $(n+1)^{th}$ image to be measured, wherein the $n^{th}$ image to be measured is referred to as a normal image to be measured, the $(n+1)^{th}$ image to be measured is referred to as an image to be measured of a frame rate fluctuation, and n is a natural number greater than 0.

2. The method of claim 1, wherein after using the image acquired from the next frame output by the camera at the first frame rate fluctuation as the $(n+1)^{th}$ image to be measured, and using the time point corresponding to the image output from the next frame as the starting point of the preset time interval after the $(n+1)^{th}$ image to be measured, the method further comprises:
   in response to determining that a second frame rate fluctuation occurs on the original images output by the camera during the preset time interval after the $(n+1)^{th}$ image to be measured, and that a time interval between the second frame rate fluctuation and the first frame rate fluctuation is greater than a predetermined minimum time interval, using an image acquired from the next frame output by the camera at the second frame rate fluctuation as an $(n+2)^{th}$ image to be measured, and using a time point corresponding to the image output from the next frame at the second frame rate fluctuation as a starting point of the preset time interval after the (n+2)$^{th}$ image to be measured, wherein the (n+2)$^{th}$ image to be measured is an image to be measured of a frame rate fluctuation;

in response to determining that at least one frame rate fluctuation occurs on the original images output by the camera during the preset time interval after the (n+1)$^{th}$ image to be measured, and that a time interval between each frame rate fluctuation of the at least one frame rate fluctuation and first frame rate fluctuation is less than or equal to the predetermined minimum time interval, acquiring an original image output by the camera through the preset time interval after the (n+1)$^{th}$ image to be measured and serving as an (n+2)$^{th}$ image to be measured, and using a time point corresponding to the (n+2)$^{th}$ image to be measured as a starting point of the preset time interval after the (n+2)$^{th}$ image to be measured, wherein the (n+2)$^{th}$ image to be measured is a normal image to be measured; or in response to determining that no frame rate fluctuation occurs on the original images output by the camera during the preset time interval after the (n+1)$^{th}$ image to be measured, acquiring an original image output by the camera through the preset time interval after the (n+1)$^{th}$ image to be measured and serving as an (n+2)$^{th}$ image to be measured, and using a time point corresponding to the (n+2)$^{th}$ image to be measured as a starting point of the preset time interval after the (n+2)$^{th}$ image to be measured, wherein the (n+2)$^{th}$ image to be measured is a normal image to be measured.

3. The method of claim 2, wherein determining whether to perform the brightness compensation on the camera according to the brightness value of the first frame image and the brightness threshold range comprises:

in response to determining that the brightness value of the first frame image is outside the brightness threshold range, performing the brightness compensation on the camera; and in response to determining that the brightness value of the first frame image is within the brightness threshold range, not performing the brightness compensation on the camera; and wherein determining whether to perform the brightness compensation on the camera according to the brightness value of the image to be measured and the brightness threshold range comprises:

in response to determining that the brightness value of the image to be measured is outside the brightness threshold range, performing the brightness compensation on the camera; and in response to determining that the brightness value of the image to be measured is within the brightness threshold range, not performing the brightness compensation on the camera.

4. The method of claim 2, wherein the brightness threshold range is determined according to a scene corresponding to which the camera continuously outputs the original images.

5. The method of claim 2, wherein the preset time interval is greater than or equal to 1 second and less than or equal to 2 seconds.

6. The method of claim 1, wherein determining whether to perform the brightness compensation on the camera according to the brightness value of the first frame image and the brightness threshold range comprises:

in response to determining that the brightness value of the first frame image is outside the brightness threshold range, performing the brightness compensation on the camera; and in response to determining that the brightness value of the first frame image is within the brightness threshold range, not performing the brightness compensation on the camera; and wherein determining whether to perform the brightness compensation on the camera according to the brightness value of the image to be measured and the brightness threshold range comprises:

in response to determining that the brightness value of the image to be measured is outside the brightness threshold range, performing the brightness compensation on the camera; and in response to determining that the brightness value of the image to be measured is within the brightness threshold range, not performing the brightness compensation on the camera.

7. The method of claim 6, wherein in response to determining that the brightness value of the first frame image is outside the brightness threshold range, performing the brightness compensation on the camera comprises:

in response to determining that the brightness value of the first frame image is less than a minimum value of the brightness threshold range, increasing an exposure degree of the camera; and in response to determining that the brightness value of the first frame image is greater than a maximum value of the brightness threshold range, reducing the exposure degree of the camera; and wherein in response to determining that the brightness value of the image to be measured is outside the brightness threshold range, performing the brightness compensation on the camera comprises:

in response to determining that the brightness value of the image to be measured is less than the minimum value of the brightness threshold range, increasing the exposure degree of the camera; and in response to determining that the brightness value of the image to be measured is greater than the maximum value of the brightness threshold range, reducing the exposure degree of the camera.

8. The method of claim 7, wherein the brightness threshold range is determined according to a scene corresponding to which the camera continuously outputs the original images.

9. The method of claim 7, wherein the preset time interval is greater than or equal to 1 second and less than or equal to 2 seconds.

10. The method of claim 6, wherein the brightness threshold range is determined according to a scene corresponding to which the camera continuously outputs the original images.

11. The method of claim 6, wherein the preset time interval is greater than or equal to 1 second and less than or equal to 2 seconds.

12. The method of claim 1, wherein the brightness threshold range is determined according to a scene corresponding to which the camera continuously outputs the original images.

13. The method of claim 1, wherein the preset time interval is greater than or equal to 1 second and less than or equal to 2 seconds.

14. An electronic device, comprising:
at least one processor; and
a memory, which is configured to store at least one program;
wherein the at least one program, when executed by the at least one processor, causes the at least one processor to implement the image processing method of claim 1.

15. A computer-readable storage medium, storing a computer program, wherein the computer program, when executed by a processor, implements the image processing method of claim 1.

16. An image processing apparatus, comprising:
- an acquisition module, which is configured to acquire a first frame image output by a camera in a case where the camera continuously outputs original images;
- a first determination module, which is configured to determine whether to perform a brightness compensation on the camera according to a brightness value of the first frame image and a brightness threshold range; and
- a second determination module, which is configured to: continue to acquire an image to be measured output by the camera after a preset time interval and determine whether to perform the brightness compensation on the camera according to a brightness value of the image to be measured and the brightness threshold range repeatedly, until the camera stops outputting the original images;
- wherein the second determination module is further configured to: in response to an occurrence of a first frame rate fluctuation on the original images output by the camera during the preset time interval after an $n^{th}$ image to be measured is acquired under a normal condition, use an image acquired from a next frame output by the camera at the first frame rate fluctuation as an $(n+1)^{th}$ image to be measured, and use a time point corresponding to the image output from the next frame as a starting point of the preset time interval after the $(n+1)^{th}$ image to be measured, wherein the $n^{th}$ image to be measured is referred to as a normal image to be measured, the $(n+1)^{th}$ image to be measured is referred to as an image to be measured of a frame rate fluctuation, and n is a natural number greater than 0.

* * * * *